April 22, 1941.  D. T. GIBB  2,239,317
SAW
Filed April 17, 1939
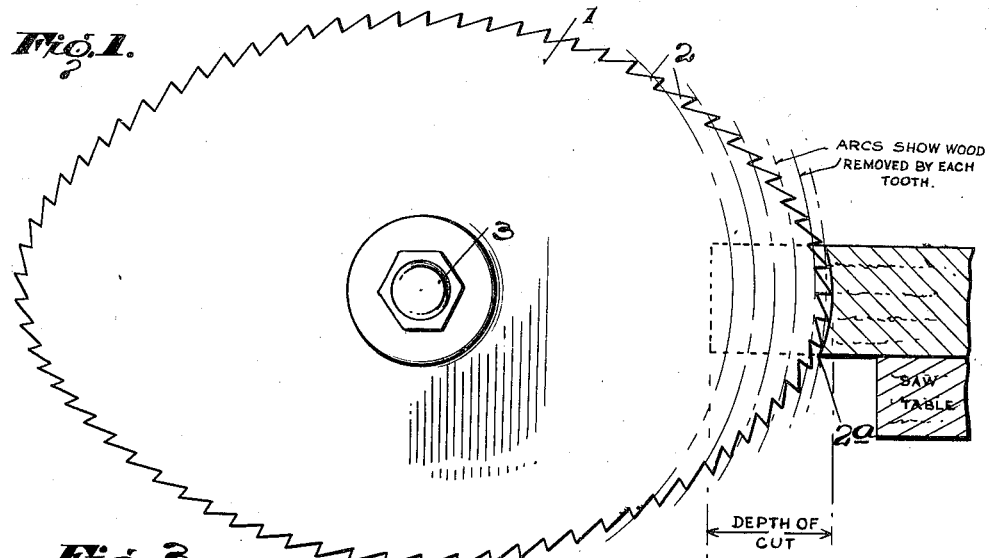
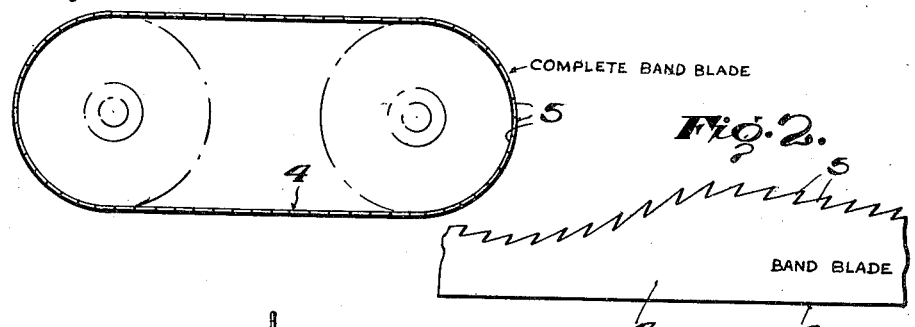
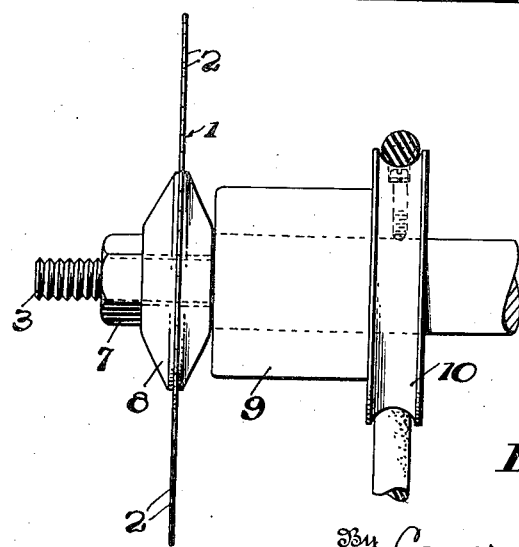
Inventor
David T. Gibb.
By Cameron, Kerkam & Sutton
Attorneys

UNITED STATES PATENT OFFICE 2,239,317

SAW

David T. Gibb, Ellensburg, Wash., assignor of one-half to J. Alva Bull

Application April 17, 1939, Serial No. 268,400

2 Claims. (Cl. 143—133)

This invention pertains to improvements in rotary and band saws, and specifically to saws of these types which are capable of cutting laterally as well as longitudinally and with which any desired type of cut may be made.

It has been proposed heretofore to provide saws of the "wobble" type with teeth spaced at varying distances from the axis of rotation, for the formation of tongues and grooves in boards, etc. Wobble saws, however, are used only for making cuts of particular sizes and shapes for which they are specifically designed, and such saws cannot be used to make ordinary saw cuts and are incapable of numerous uses and applications to which a saw embodying the present invention may be put.

One object of the present invention is to provide a novel saw blade which may be used on any power saw table adapted to standard blades and which will not only cut longitudinally in the manner of the standard blade, but which may be used also to cut laterally to either side, without adjustment.

Another object of the invention is to provide a novel power saw blade with which, without adjustment of the saw, a great variety of cuts may be made including ordinary saw cuts, slots, grooves, bevels, circles and wavy lines, etc.

Other and further objects of the invention will become apparent as this specification proceeds.

Referring to the drawing:

Fig. 1 is a side view of a rotary saw blade embodying the invention and designed to be used on the standard rotary saw table;

Fig. 2 is a side view of a section of a band saw blade embodying the invention;

Fig. 3 is a schematic view of the complete band saw; and

Fig. 4 is a view showing the mounting of the rotary saw blade.

Referring to Fig. 1, I indicates a noncircular saw blade which as shown is generally elliptical in shape and preferably symmetrical so that it is balanced for rotation. The blade I, which may be of any suitable size, is provided with saw teeth 2 arranged about its periphery at varying radii from the center of rotation of the blade. Teeth 2 are preferably of uniform size and standard cut. It will be noted that teeth 2a on the arc of longest radius at each side of the blade are designed to perform the forward cutting. If desired, a number of these teeth 2a may be disposed at the same distance from the center of rotation of the blade. As shown in Fig. 4, blade I is designed to be mounted at right angles on drive shaft 3 in any suitable manner as by means of a nut 7 and washers 8. The drive shaft is provided with a suitable bearing 9 and a drive pulley 10.

A saw table and section of wood are shown in Fig. 1 and arcs drawn to illustrate the areas of lateral cutting action of the various teeth as explained hereinafter.

In Fig. 2, 4 illustrates a section of a band saw blade with standard teeth 5 disposed along one edge at varying distances from the rear edge 6 of the blade. The complete band saw blade, which is shown schematically in Fig. 3, may be composed of any desired number of these sections.

The rotary saw functions as follows. By moving the material against the blade in a direction parallel to the plane of the blade, an ordinary saw cut is obtained. If lateral cutting is desired, the work is then moved in a direction at right angles to the plane of the blade. As may be seen from Fig. 1, as the blade I revolves the set of each tooth scrapes off a different portion of the side of the cut and the combined cuts remove a thin layer from the entire side of the cut. Thus, by moving the material at right angles to the blade a lateral cut of any desired width can be made. In one movement of the material a lateral cut can be made of any depth up to the difference in length between the longest and shortest arcs. If a deeper cut is desired the process can be repeated.

In order to assure that the rear edge of the cut be square the material must be presented to the saw in the plane of the axis. If a bevel is desired, the material may be presented on a plane above or below the plane of the axis, depending upon which side of the material is to be beveled. A bevel may likewise be made by tilting the material. The rear edge of the cut may also be partly square and partly beveled.

By presenting the material to the saw at different angles, either by the use of guides or by tilting the work table or the table on which the saw is mounted, a great variety of cuts may be made. Circles may be cut by so presenting the material that the wood outside of the circumference is laterally cut away. Similarly, wavy lines of any desired shape may be cut. Cupped shapes can be cut by presenting the flat side of the material to the saw and then revolving the material.

The band saw blade operates on the same principle. By setting the teeth at gradually increasing and decreasing distances from the rear edge of the blade, the set of each succeeding tooth removes a different portion from the side of the cut. The band saw may be used to make as many different types of cut as the elliptical saw and its method of use is substantially the same.

It will be seen that saws embodying the present invention possess an adaptability and flexibility of use unknown in prior saws. They may be used to make the usual longitudinal cuts, or conversely, without in any way changing the position or adjustment of the blade, any type of odd cut desired may be made, including dovetail and dished cuts.

This invention is susceptible of many embodiments and applications and nothing in this specification is intended to limit its scope, attention being had to the appended claims for this purpose.

What is claimed is:

1. In a power saw, a rotary drive shaft, an elliptical plane blade mounted at right angles to said drive shaft for rotation about its center, uniform teeth formed about the periphery of said blade at varying radii from the axis of rotation of said blade, all of said teeth lying in the plane of the blade, whereby the cutting arcs of said teeth are different but complementary and both longitudinal and lateral cuts can be made according to the direction of feed of the work.

2. In a rotary saw, a substantially elliptical plane blade, a drive shaft for said blade, means carried by said shaft for rigidly mounting said blade at right angles to said shaft for rotation about its center, and uniform teeth set in the periphery of said blade at varying radii from the center of rotation of said blade, all of said teeth lying in the plane of the blade, whereby the cutting arcs of said teeth are different but complementary, certain of said teeth throughout a limited arc being at the same distance from the center of rotation of said blade, whereby both longitudinal and lateral cuts may be made with said blade according to the direction of feed of the work.

DAVID T. GIBB.